Jan. 10, 1928.

K. STOYE 1,655,922

BONE SHAPING AND THREADING DEVICE

Filed March 18, 1924

INVENTOR
Kurt Stoye
BY
Clarence G. Campbell
his ATTORNEY.

Patented Jan. 10, 1928.

1,655,922

UNITED STATES PATENT OFFICE.

KURT STOYE, OF FLUSHING, NEW YORK, ASSIGNOR TO THE KNY-SCHEERER CORPORATION OF AMERICA, OF NEW YORK, N. Y., A CORPORATION OF NEW YORK.

BONE SHAPING AND THREADING DEVICE.

Application filed March 18, 1924. Serial No. 700,184.

This invention relates to bone shaping and threading devices, and the novelty consists in the adaptation and arrangement of the parts, as will be more fully hereinafter pointed out.

The subject matter of this application is divided out from my co-pending application Serial No. 643,837, filed June 7, 1923.

In the treatment of various bone fractures and in the setting of new pieces of bone, which are usually cut from the shin of the person being treated, it is very often found necessary to pin the piece of bone which is being inlaid to the surrounding bone tissue where it is placed in order to assure the inlaid pieces staying in exact position and growing exactly into that position.

Many different substances have been tried for pinning together such bone members, including the use of prepared beef bone pins which come prepared and sterilized for this purpose, but which do not readily knit with the human bone as will a piece of bone of the person being treated which is of a finer texture and harder than the beef bone.

There has, therefore, come to be a tremendous demand for a properly threaded pin or screw of human bone for use in pinning together the new bone or inlay with the surrounding bone into which such inlay is placed, and in order to be sure of perfect knitting it is now recognized by the medical profession that it is necessary to use a bone pin or screw taken from the person being treated the same as the inlay is taken usually from the shin of the person being treated.

This must all be done under the usual sterile conditions of the operating room, and must be done quickly as the operation is necessarily a long one and every minute counts. My device is adapted to solve this problem, being adapted to shape a piece of bone cut from the person being treated and threading the same in the same device without loss of time and all under the sterile conditions required in such operations.

Figure 1:
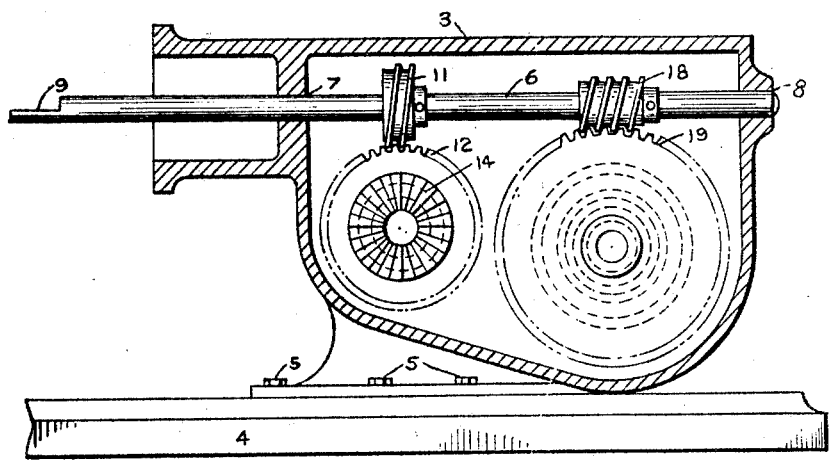
Figure 2:
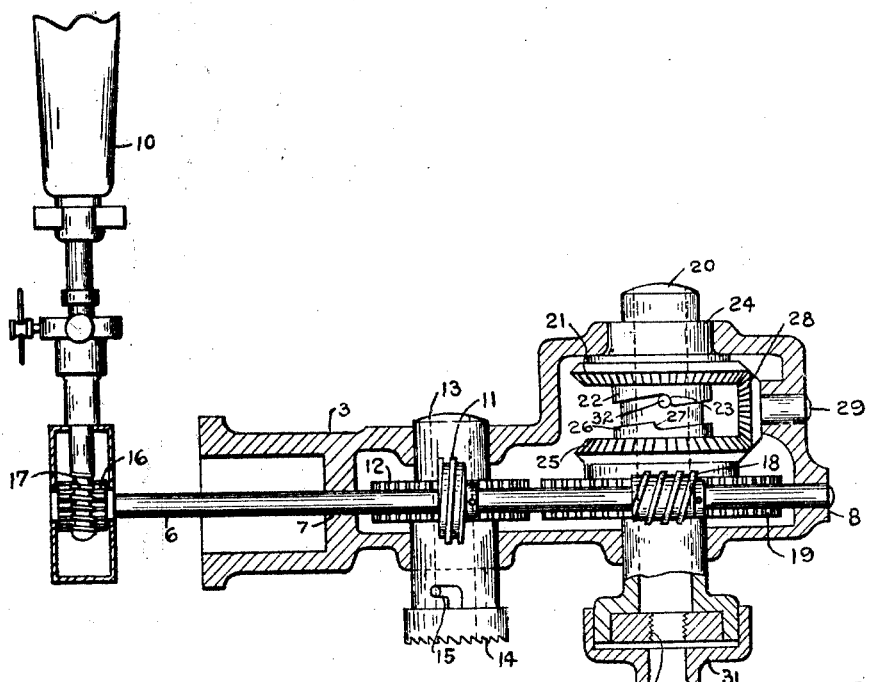

Referring to the drawings, Figure 1 is an embodiment of my device in which the casing is cut open vertically in order to show the interior construction; and Figure 2 is a top plan view of the device shown in Figure 1 with the top of the casing cut off in order to show the interior construction.

In the construction shown herein the bone shaping and thread cutting device is shown complete in one device so that it can be readily and quickly used without making any change of parts.

In the drawings a casing 3 is rigidly secured to a base 4 at 5 and is adapted to hold a driving shaft 6 in bearings 7 and 8, said shaft 6 having a cut-out or flattened portion 9 adapted to connect up directly with the driving shaft of a motor 10 through cut gear 16 and worm gear 17. On the driving shaft 6 is a worm gear 11 adapted to mesh with a cut gear 12 which is rigidly mounted on a shaft 13 which runs freely in the casing 3, and a tubular saw or dowel former 14 is adapted to be fitted and locked into said shaft 13 by means of a bayonet lock 15.

The shaft 6 also has a worm drive gear 18 adapted to mesh with a cut gear 19 which is mounted on a shaft 20, which is supported in suitable bearings in the casing 6. A tool spindle bevel gear 21 having a sleeve 22 to which it is rigidly secured, and which sleeve 22 has a cut-out 23 on the inner end, is mounted on said shaft 20 in a bearing 24 of said casing 6. A second tool spindle bevel gear 25 is also mounted on said shaft 20 within the cut gear 19 so that it always rotates therewith, and said sleeve 26 has a cut-out 27. An idler bevel gear 28 is mounted on a shaft 29 in the casing 6 so that it rotates freely. Said idler gear 28 is always in mesh with the tool spindle bevel gears 21 and 25 so that the gears 21 and 25 always travel in opposite directions. A pin 32 is rigidly secured in the shaft 20 and is adapted to engage cut-outs 23 and 27 according to the position of the shaft 20. In the outer end of the shaft 20 is adapted to be mounted a threading device of usual construction 30, and over the end of the shaft 20 is adapted to be placed a guide member 31 which can be readily removed when not needed and which is particularly required in starting the threading operation in order to assure true alignment.

In operating my device as shown and described in connection with Figures 3 and 4, the shaft 6 will be in continuous rotation when the power is turned on in the motor 10 with which my device is adapted to be used. As the shaft 6 rotates the worm gear 11 rotates therewith, and through the cut gear 12 will cause the shaft 13 and shaper 14 mounted thereon to also rotate therewith. As the shaft 6 rotates the worm gear 18 thereon also rotates, thereby causing the cut gear 19 with which it meshes to rotate, and tool spindle bevel gear 25 being rigidly secured to cut gear 19 also rotates therewith thereby causing the idler bevel gear 28 which is always in mesh with tool spindle bevel gear 25 to rotate therewith, and tool spindle bevel gear 21 which also is always in mesh with the idler gear 28 will likewise rotate therewith. As the bone bolt is pushed into the guideway 31 and the threader 30 the shaft 20 is thereby pushed in until the pin 29 engages the cut-out 23, thereby causing the shaft 20 to rotate in the direction of the gear 21, and as the threading operation is completed and the operator pulls in the opposite or outward direction to withdraw the threaded bolt the shaft 20 is thereby pulled outwardly disengaging the pin 29 from the cut-out 23 and causing it to engage with cut-out 27 so that the shaft 20 is thereby rotated in the same direction with the bevel gear 25 which is the opposite direction from the rotation of the bevel gear 21, and will thereby tend to turn the threaded bolt or pin out finally ejecting it at the outer end of the threader 30 thereby completing the threading operation. In this device it is seen that the bone which has just been cut from the shin of the person being treated can be quickly and readily shaped by means of the shaper 14, and then can be quickly and readily threaded by means of the threader 30 so that a threaded pin or bolt of the patient's own bone is quickly and easily prepared under absolutely sterile conditions in such a way that it can be used immediately in securing together the inlaid portion with the surrounding bone material so as to effect a perfect growth of the bone material together in the exact position required.

A cutting saw of usual construction is adapted to be secured to the motor 10 in place of the worm gear 17 so that said motor and saw can be used to first cut the bone from the shin of the person being operated upon so as to furnish the material from which to make the dowel pin which is to be threaded for carrying out the operation as described.

I claim:

1. In combination a bone cutting machine, means for shaping the cut bone and parallel therewith, means for threading the shaped bone and a common means for driving both of said shaping and threading means driven by said cutting machine.

2. In combination a bone cutting machine means for shaping the cut bone and parallel therewith, means for threading the shaped bone and an automatically driven common means for driving both of said shaping and threading means driven by said cutting machine.

3. In combination means for shaping a bone when cut, means for threading said bone when shaped and a separable common driving means for said shaping and threading means driven by a bone cutting machine.

4. In an automatic bone cutting machine means for shaping and threading the bone when cut, comprising a casing separately attachable to said machine containing a shaft driven by said machine which through a worm gear and a cut gear drives a bone shaper, a second worm on said shaft driving a cut gear which carries a bevel gear rigidly connected thereto, an idler bevel gear in constant mesh with said bevel gear, a third bevel gear in mesh with said idler so that it runs in the opposite direction to the first bevel gear, a bone threader on a shaft running through said first and third bevel gears, and a pin rigidly mounted on said shaft adapted to mesh with cut-out projections on said bevel gears as the shaft is pushed in or pulled out.

5. In combination a bone cutting machine, a separable casing adapted to be secured thereto and containing a bone shaping means and a bone threading means both operated by said cutting machine and a base member to support all.

6. In combination an automatic bone cutting machine, means for shaping the bone when cut, means for threading said bone when shaped, and a base member adapted to support all.

7. In an automatic bone cutting machine means for shaping and threading the bone when cut, comprising a casing separably attachable to said machine containing a shaft driven by said machine which through a worm gear and a cut gear drives a bone shaper, a second worm on said shaft driving a cut gear which carries a bevel gear rigidly connected thereto, an idler bevel gear in constant mesh with said bevel gear, a third bevel gear in mesh with said idler so that it runs in the opposite direction to the first bevel gear, a bone threader on a shaft running through said first and third bevel gears, a pin rigidly mounted on said shaft adapted to mesh with cut-out projections on said bevel gears as the shaft is pushed in or pulled out, and a base member adapted to support all.

In testimony whereof I affix my signature.

KURT STOYE.